C. B. KURTZ.
TRANSMISSION GEARING.
APPLICATION FILED DEC. 7, 1908.
942,266.
Patented Dec. 7, 1909.
2 SHEETS—SHEET 1.
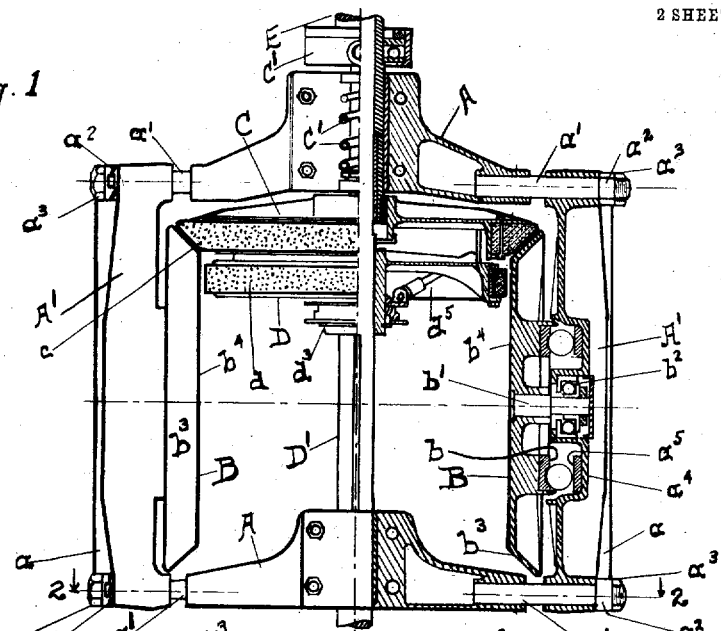
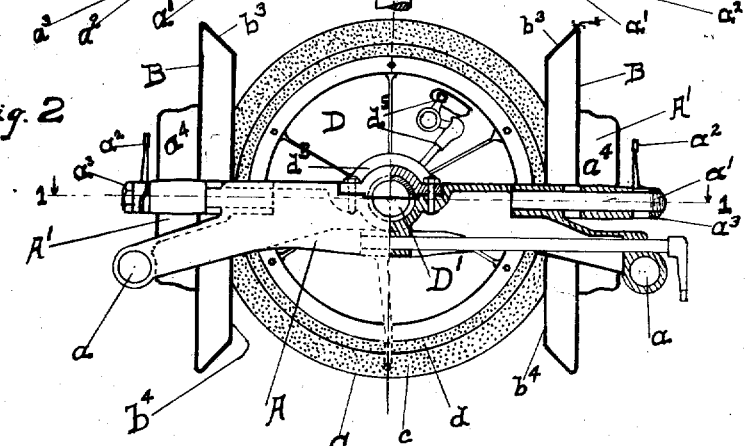
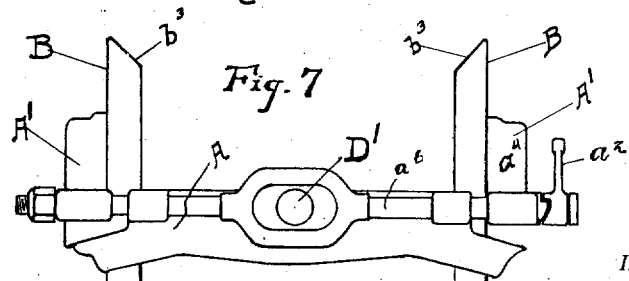
WITNESSES:
INVENTOR.
Cyrus B. Kurtz
BY
J. B. Fay
ATTORNEY.

C. B. KURTZ.
TRANSMISSION GEARING.
APPLICATION FILED DEC. 7, 1908.
942,266.
Patented Dec. 7, 1909.
2 SHEETS—SHEET 2.
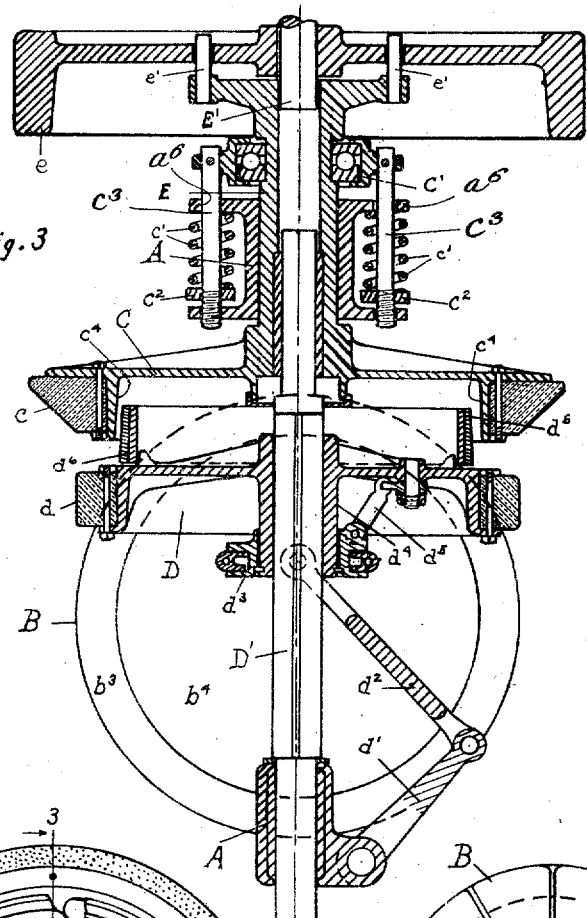
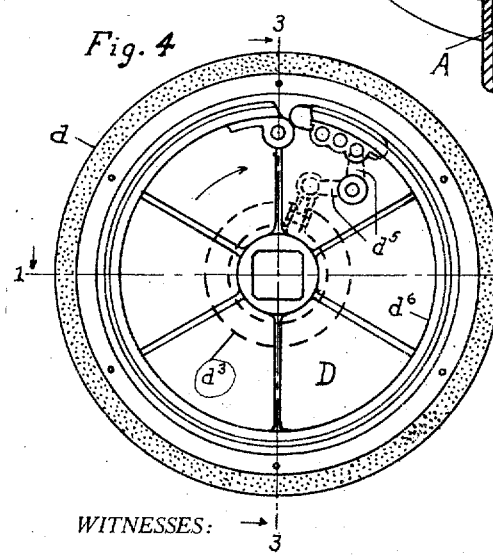
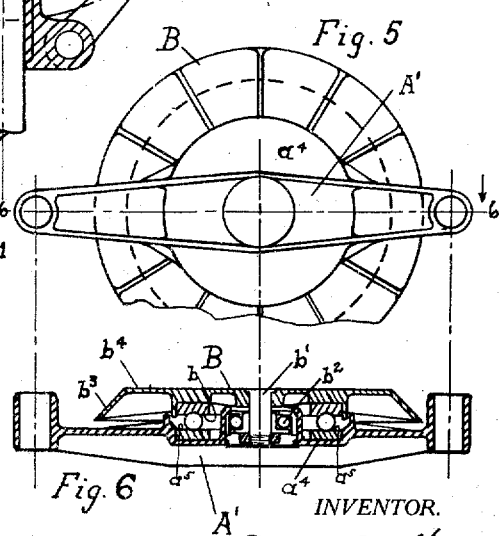
WITNESSES:
INVENTOR.
Cyrus B. Kurtz
BY
J. B. Fay
ATTORNEY

UNITED STATES PATENT OFFICE.

CYRUS B. KURTZ, OF LAKEWOOD, OHIO.

TRANSMISSION-GEARING.

942,266.

Specification of Letters Patent.

Patented Dec. 7, 1909.

Application filed December 7, 1908. Serial No. 466,218.

*To all whom it may concern:*

Be it known that I, CYRUS B. KURTZ, a citizen of the United States, and a resident of Lakewood, county of Cuyahoga, and State of Ohio, have invented a new and useful Improvement in Transmission-Gearing, of which the following is a specification, the principle of the invention being herein explained and the best mode in which I have contemplated applying that principle, so as to distinguish it from other inventions.

The object of my present invention is the provision of a " friction " transmission gearing suitable for incorporation in an automobile structure, and one that will at the same time possess the desirable qualities of durability and efficiency.

To the accomplishment of these and related ends, said invention, then, consists of the means hereinafter fully described and particularly pointed out in claims.

The annexed drawings and the following description set forth in detail certain mechanism embodying the invention, such disclosed means constituting, however, but one of various mechanical forms in which the principle of the invention may be used.

In said annexed drawings:—Figure 1 is a part plan and part sectional view of a transmission gearing particularly adapted for automobile use, wherein are embodied my several improvements; Fig. 2 is a rear end elevation of such gearing with a part again shown in section, the plane of the section being indicated by the line 2—2, Fig. 1; Fig. 3 is a central longitudinal section of the gearing; Fig. 4 is a front elevation of the main or driven disk apart from the remainder of the mechanism; Fig. 5 is a similar view of one of the side members composing the frame of the device; Fig. 6 is a sectional view of the same and of a friction disk supported thereby, the section being taken on the line 6—6, Fig. 5; and Fig. 7 is a rear elevation showing a modification in construction.

As has been indicated, a considerable field of use for a transmission gearing of the character in hand is offered by the automobile, wherein, as is well known, numerous attempts at friction transmission gearing of power from the motor to the live axle have been made with only partial success. It is not intended, however, to indicate any limitation of the invention to this single application, or field of use, although the structure illustrated is primarily designed for automobile use where the compactness of such illustrated structure will be found of particular merit. Referring, then, particularly to Figs. 1 and 2, the frame of the device will be seen to comprise two end members A secured together by stay rods or bars $a$. The lateral portions of such end members preferably comprise bars or rods $a'$ upon which are movably mounted the two side members $A'$, the construction of which is shown in detail in Figs. 5 and 6. Movement of these side members inwardly upon such lateral portions $a$ of the end members is secured by rocking cams $a^2$ mounted on such portions between the members and retaining nuts $a^3$, these cams being suitably connected together to be operated by a single actuating element as a pedal, or lever, (not shown) as will be readily understood.

Each side member $A'$ includes a central disk-like portion $a^4$ upon the inner face of which is provided a ball race $a^5$, or similar annular bearing removed from the center of the disk, against which the correspondingly formed rear face $b$ of a friction disk B is designed to press, such friction disk being held in place on the side member by a central pin $b'$, free rotation of which is assured by ball bearings $b^2$ provided in connection therewith. Such disk is provided with a beveled edge $b^3$ adapted upon the inward actuation of the side members, to frictionally contact with the transversely disposed driving disk C, while its face $b^4$ will similarly contact with the driven disk D, both as will be now more particularly described.

The driven shaft $D'$ upon which such driven disk is mounted so as to be longitudinally movable along the same but non-rotatable thereabout, is journaled in the end members A of the frame, Figs. 1 and 3, its forward end slidably entering into a tubular shaft section E into the other end of which extends the engine or driving shaft $E'$. The latter bears the usual fly-wheel $e$ which is non-rotatably secured to the tubular shaft section, or sleeve E, just referred to, by pins $e'$ that permit a slight longitudinal movement of said sleeve relatively to shaft $E'$ and the fly-wheel. Said sleeve bears at its rear end, which extends within the forward end member of the transmission frame, the driving disk C previously referred to as being formed with a beveled edge $c$ adapted to coöperate with the beveled edges $b^3$ of the lateral disks respectively. A set of springs $c'$ is interposed between ears $a^6$ on the forward end member of the frame and nuts $c^2$ on bolts $c^3$ that pass through such ears and are fixedly attached at their outer ends to a thrust collar $C'$ rotatably but not longitudinally movable upon sleeve E. It will accordingly be seen that any endwise movement of the driving disk C that may result upon movement of the two side disks B inwardly, will be opposed by the springs in question. The longitudinal position of sleeve E, and hence of disk C, may be varied by suitable adjustment of nuts $c^2$ which also serve as stops to prevent disk C from undue rearward movement, all without varying the pressure exerted by the springs.

The driven disk D longitudinally movable, as stated, along that portion of the driven shaft $D'$ lying between the two end members A of the frame, has a straight edge $d$ with which the faces $b^4$ of the lateral disks are adapted to contact, but not until after the beveled edges of said disks engage the beveled edges of the driving disk. As a result of this construction, it will be obvious that a uniform pressure will be exerted upon such beveled faces equal to the pressure of the springs $c'$ that back up or support the driving disk, but that as to the contact between the lateral disk faces and the driven member, any degree of pressure can be secured that may be found desirable.

Movement of the driven disk D along the driven shaft to vary its point of engagement with the lateral disks, is effected by means of a rock arm $d'$ and a link, or connecting rod $d^2$, attached at its inner end to a collar $d^3$ longitudinally slidably mounted upon the hub $d^4$ of the driven disk. This collar is connected by means of suitable levers $d^5$ with an expanding clutch ring $d^6$ attached to the front face of said driven disk, and adapted in its expanded condition to fixedly engage an internal clutch surface $c^4$ formed on the rear face of the driving disk C. Operation of the rock-arm will normally be effective simply to move the driven disk in one direction or other along its shaft, but when said disk has been advanced to its forward position, in which the front end of its hub contacts with the hub of the driving disk, any further movement of arm $d'$ will serve to expand the aforesaid clutch, thereby directly securing the driven disk to the driving disk. In this position of parts a direct drive from the engine shaft is had without any operation of the lateral or intermediate disks B whatever.

The general operation of my improved transmission gear should be obvious from the foregoing description of the construction of its several parts and their individual operation. I desire, however, to call particular attention to the fact that the pressure on the side members $A'$ of the frame whereby the latter, together with the lateral or intermediate disks, are movable inwardly, is exerted at points lying without said disks, and that the latter are supported by a thrust bearing, as result of which, the tendency of the disk to tilt on its axis is overcome in large degree. At the same time the necessity of having an elongated central bearing for said disk is done away with and the width of the frame correspondingly decreased. Finally I am enabled by the use of a constant resilient pressure back of the driving disk to always obtain the proper pressure between such disk and the intermediate or lateral disks without regard to the degree of pressure that may be desired between these and the driven disk, which latter pressure should, of course, vary depending upon the change in leverage as the driven disk is shifted from one position to another. All this involves no additional operating parts any more than does the arrangement for directly clutching the driven to the driving disks.

A further advantage residing in my construction of gearing is that incident to the sliding connection of driven shaft $D'$ with the tubular shaft section E, whereby the need for interposing a separate sliding connection or joint in said shaft $D'$ between the gearing and the axle is done away.

The modification in construction illustrated in Fig. 7 consists in the substitution of different mechanism for drawing the lateral disks together from that shown in the preceding figures, whereby power for this purpose need be applied to one side only. In other words by having the side members $A'$ of the frame bodily movable in the manner hereinbefore described, and by further utilizing a transverse tie-rod, as $a^6$, at each end, I am enabled to draw said side members together by one set of cams $a^2$. By this arrangement, moreover, no strain whatever is put upon the end-members A, as would otherwise be the case, so that the latter may be built of aluminum or other light material. So, too, since the end-members A and such tie-rods $a^6$ hold the side members against turning there is no need of any stays $a$ in this modified construction.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the class described, the combination with a frame; of a shaft to be driven journaled in said frame; friction disks borne by said frame so as to be movable toward and from said shaft; a friction disk longitudinally slidable but non-rotatably mounted upon said shaft between said first-named disks; a friction disk adapted to be connected with the driving shaft and to peripherally engage said first-named disks; and positively operating clutch means borne by said driven disk and movable relatively thereto; to directly connect the same with said driving disk.

2. In mechanism of the class described, the combination with a frame comprising end members and side members movably mounted relatively to said end members; of a shaft to be driven journaled in said end members; friction disks borne by said side members, respectively, said disks lying within the points of support of said side members on said end members; a friction disk longitudinally slidably but non-rotatably mounted upon said driven shaft and adapted to engage the faces of said first-named disks; and a driving disk adapted to engage the edges of said first-named disks.

3. In mechanism of the class described, the combination with a frame comprising end members and side members movably mounted relatively to said end members; of a shaft to be driven journaled in said end members; friction disks borne by said side members, respectively, said disks lying within the points of support of said side members on said end members; a friction disk longitudinally slidably but non-rotatably mounted upon said driven shaft and adapted to engage the inner faces of said first-named disks, said side members being provided with thrust bearings for the outer faces of said disks; and a driving disk adapted to engage the edges of said disks.

4. In mechanism of the class described, the combination with a frame comprising end members and side members movably mounted relatively to said end members; of a shaft to be driven journaled in said end members; friction disks borne by said side members, respectively, said disks lying within the points of support of said side members on said end members; a friction disk longitudinally slidably but non-rotatably mounted upon said driven shaft and adapted to engage the inner faces of said first-named disks, said disks having central pins and said side members being provided with bearings for such pins and with thrust bearings for the outer faces of said disks; and a driving disk adapted to engage the edges of said disks.

5. In mechanism of the class described, the combination with a frame; of a shaft to be driven journaled in said frame, said frame including members movable toward and from said shaft; friction disks borne by said frame members so as to be movable therewith; a friction disk longitudinally slidably but non-rotatably mounted upon said driven shaft and adapted to engage the inner faces of said first-named disks, said frame members being provided with thrust bearings for the outer faces of said disks; and a driving disk adapted to engage the edges of said first-named disks.

6. In mechanism of the class described, the combination with a frame; of a shaft to be driven journaled in said frame, said frame including members movable toward and from said shaft; friction disks borne by said frame members so as to be movable therewith; a friction disk longitudinally slidably but non-rotatably mounted upon said driven shaft and adapted to engage the inner faces of said first-named disks, said disks having central pins and said frame members being provided with bearings for such pins and with thrust bearings for the outer faces of said disks; and a driving disk adapted to engage the edges of said disks.

7. In mechanism of the class described, the combination with a frame comprising end members and side members movably mounted on said end members; of a shaft to be driven journaled in said end members; friction disks with bevel edges borne by said side members, respectively; a friction disk with a straight edge longitudinally slidably, but non-rotatably mounted upon said shaft, between said first-named disks; a friction disk adapted to be connected with the driving shaft, said last-named disk having a bevel edge adapted to be engaged by the bevel edges of said first-named disks prior to engagement of the straight edge of the disk on the driven shaft by the faces of said first-named disks; means adapted to draw said side members together to bring said first-named disks thus into engagement with said other disks; and resilient means adapted to retain said driving disk in engagement with said first-named disks.

8. In mechanism of the class described, the combination with a frame comprising end members and side members movably mounted on said end members; of a shaft to be driven journaled in said end members; friction disks with bevel edges borne by said side members, respectively, said disks lying within the points of support of said side members on said end members; a friction disk with a straight edge longitudinally slidably, but non-rotatably mounted upon said shaft, between said first-named disks; a friction disk adapted to be connected with the driving shaft, said last-named disk having a bevel edge adapted to be engaged by the bevel edges of said first-named disks prior to engagement of the straight edge of the disk on the driven shaft by the faces of said first-named disks; means adapted to draw said side members together to bring said first-named disks thus into engagement with said other disks; and resilient means adapted to retain said driving disk in engagement with said first-named disks.

9. In mechanism of the class described, the combination with a frame comprising end members and side members movably mounted on said end members; of a shaft to be driven journaled in said end members; friction disks with bevel edges borne by said side members, respectively, said disks bearing with their outer faces against said side members; a friction disk with a straight edge longitudinally slidably, but non-rotatably mounted upon said shaft, between said first-named disks; a friction disk adapted to be connected with the driving shaft, said last-named disk having a bevel edge adapted to be engaged by the bevel edges of said first-named disks prior to engagement of the straight edge of the disk on the driven shaft by the faces of said first-named disks; means adapted to draw said side members together to bring said first-named disks thus into engagement with said other disks; and resilient means adapted to retain said driving disk in engagement with said first-named disks.

10. In mechanism of the class described, the combination with a frame comprising end members and side members movably mounted on said end members; of a shaft to be driven journaled in said end members; friction disks with bevel edges borne by said side members, respectively, said disks lying within the points of support of said side members on said end members, and bearing with their outer faces against said side members; a friction disk adapted to be connected with the driving shaft, said last-named disk having a bevel edge adapted to be engaged by the bevel edges of said first-named disks prior to engagement of the straight edge of the disk on the driven shaft by the faces of said first-named disks; means adapted to draw said side members together to bring said first-named disks thus into engagement with said other disks; and resilient means adapted to retain said driving disk in engagement with said first-named disks.

11. In mechanism of the class described, the combination with a frame; of a shaft to be driven journaled in said frame; friction disks borne by said frame so as to be movable toward and from said shaft; a friction disk longitudinally slidably but non-rotatably mounted upon said shaft between said first-named disks; a friction disk adapted to be connected with the driving shaft and to peripherally engage said first-named disks; means adapted to shift said driven disk along its shaft; and positively operating clutch means borne by said driven disk and movable relatively thereto to directly connect the same with said driving disk, said shifting means being effective to actuate said connecting means in one limiting position of said driven disk.

12. In mechanism of the class described, the combination with a frame; of a shaft to be driven journaled in said frame; friction disks with bevel edges borne by said frame so as to be movable toward and from said shaft; a friction disk with a straight edge longitudinally slidably but non-rotatably mounted upon said shaft between said first-named disks; a friction disk adapted to be connected with the driving shaft and having a bevel edge adapted to be engaged by the bevel edges of said first-named disks prior to engagement of the straight edge of the disk on the driven shaft by the faces of said first-named disks; and positively operating clutch means borne by said driven disk and movable relatively thereto to directly connect the same with said driving disk.

13. In mechanism of the class described, the combination with a frame; of a shaft to be driven journaled in said frame; friction disks with bevel edges borne by said frame so as to be movable toward and from said shaft; a friction disk with a straight edge longitudinally slidably but non-rotatably mounted upon said shaft between said first-named disks; a friction disk adapted to be connected with the driving shaft and having a bevel edge adapted to be engaged by the bevel edges of said first-named disks prior to engagement of the straight edge of the disk on the driven shaft by the faces of said first-named disks; means adapted to draw said side members together to bring said first-named disks thus into engagement with said other disks; resilient means adapted to retain said driving disk in engagement with said first-named disks; means adapted to shift said driven disk along its shaft; and positively operating clutch means borne by said driven disk and movable relatively thereto to directly connect the same with said driving disk, said shifting means being effective to actuate said clutch means in one limiting position of said driven disk.

14. Transmission mechanism comprising a driving shaft; a driven shaft alined therewith; a friction disk connected with said driving shaft so as to be axially movable relatively thereto; other disks adapted to engage said driving disk; means for connecting said other disks with said driven shaft; resilient means adapted to retain said driving disk thus in engagement with said other disks; and clutch means, unaffected by such resilient means, adapted to connect said driving disk with said driven shaft.

15. Transmission mechanism comprising a driving shaft; a driven shaft alined therewith; a tubular shaft inclosing the adjacent ends of said two shafts, said tubular shaft being freely movable both rotatably and longitudinally with respect to said driven shaft but only longitudinally with respect to said driving shaft; a friction disk borne by said tubular shaft; and other disks adapted to connect said first-named disk with said driven shaft.

16. Transmission mechanism comprising a driving shaft; a driven shaft alined therewith; a tubular shaft inclosing the adjacent ends of said two shafts, said tubular shaft being freely movable both rotatably and longitudinally with respect to said driven shaft but only longitudinally with respect to said driving shaft; resilient means supporting said tubular shaft against movement toward said driving shaft; a friction disk borne by said tubular shaft; and other disks adapted to connect said first-named disk with said driven shaft.

17. Transmission mechanism comprising a driving shaft; a driven shaft alined therewith; an externally supported tubular shaft inclosing the adjacent ends of said two shafts, said tubular shaft being freely movable both rotatably and longitudinally with respect to said driven shaft but only longitudinally with respect to said driving shaft; a collar mounted upon said tubular shaft so as to be rotatably but not longitudinally movable with respect thereto; springs resiliently supporting said collar against movement toward said driving shaft; a friction disk borne by said tubular shaft; and other disks adapted to connect said first-named disk with said driven shaft.

18. Transmission mechanism comprising a driving shaft; a driven shaft alined therewith; a friction disk connected with said driving shaft so as to be axially movable relatively thereto; other disks adapted to engage said driving disk; means for connecting said other disks with said driven shaft; resilient means adapted to retain said driving disk thus in engagement with said other disks; and means for adjusting the initial position of said driving disk independently of said resilient means.

19. Transmission mechanism comprising a driving shaft; a driven shaft alined therewith; a tubular shaft inclosing the adjacent ends of said two shafts, said tubular shaft being movable both rotatably and longitudinally with respect to said driven shaft but only longitudinally with respect to said driving shaft; a friction disk borne by said tubular shaft; other disks adapted to connect said first-named disk with said driven shaft; and means for adjusting the initial position of said tubular shaft and thus of the disk borne thereby.

20. Transmission mechanism comprising a driving shaft; a driven shaft alined therewith; an externally supported tubular shaft inclosing the ends of said two shafts, said tubular shaft being movable both rotatably and longitudinally with respect to said driven shaft but only longitudinally with respect to said driving shaft; a collar mounted upon said tubular shaft so as to be rotatably but not longitudinally movable with respect thereto; springs resiliently supporting said collar against movement toward said driving shaft; a friction disk borne by said tubular shaft; other disks adapted to connect said first-named disk with said driven shaft; and means for adjusting the initial position of said collar and thus of the disk borne thereby independently of said resilient means.

Signed by me this 2nd day of December, 1908.

CYRUS B. KURTZ.

Attested by—
MARY GLADWELL,
JNO. F. OBERLIN.

---

Correction in Letters Patent No. 942,266.

It is hereby certified that in Letters Patent No. 942,266, granted December 7, 1909, upon the application of Cyrus B. Kurtz, of Lakewood, Ohio, for an improvement in "Transmission-Gearing," an error appears in the printed specification requiring correction, as follows: Page 3, line 12, after the word "thereto," the semicolon should be stricken out; and that the said Letters Patent should be read with this correction therein, that the same may conform to the record of the case in the Patent Office.

Signed and sealed this 28th day of December, A. D., 1909.

[SEAL.]

E. B. MOORE,

*Commissioner of Patents.* being freely movable both rotatably and longitudinally with respect to said driven shaft but only longitudinally with respect to said driving shaft; a friction disk borne by said tubular shaft; and other disks adapted to connect said first-named disk with said driven shaft.

16. Transmission mechanism comprising a driving shaft; a driven shaft alined therewith; a tubular shaft inclosing the adjacent ends of said two shafts, said tubular shaft being freely movable both rotatably and longitudinally with respect to said driven shaft but only longitudinally with respect to said driving shaft; resilient means supporting said tubular shaft against movement toward said driving shaft; a friction disk borne by said tubular shaft; and other disks adapted to connect said first-named disk with said driven shaft.

17. Transmission mechanism comprising a driving shaft; a driven shaft alined therewith; an externally supported tubular shaft inclosing the adjacent ends of said two shafts, said tubular shaft being freely movable both rotatably and longitudinally with respect to said driven shaft but only longitudinally with respect to said driving shaft; a collar mounted upon said tubular shaft so as to be rotatably but not longitudinally movable with respect thereto; springs resiliently supporting said collar against movement toward said driving shaft; a friction disk borne by said tubular shaft; and other disks adapted to connect said first-named disk with said driven shaft.

18. Transmission mechanism comprising a driving shaft; a driven shaft alined therewith; a friction disk connected with said driving shaft so as to be axially movable relatively thereto; other disks adapted to engage said driving disk; means for connecting said other disks with said driven shaft; resilient means adapted to retain said driving disk thus in engagement with said other disks; and means for adjusting the initial position of said driving disk independently of said resilient means.

19. Transmission mechanism comprising a driving shaft; a driven shaft alined therewith; a tubular shaft inclosing the adjacent ends of said two shafts, said tubular shaft being movable both rotatably and longitudinally with respect to said driven shaft but only longitudinally with respect to said driving shaft; a friction disk borne by said tubular shaft; other disks adapted to connect said first-named disk with said driven shaft; and means for adjusting the initial position of said tubular shaft and thus of the disk borne thereby.

20. Transmission mechanism comprising a driving shaft; a driven shaft alined therewith; an externally supported tubular shaft inclosing the ends of said two shafts, said tubular shaft being movable both rotatably and longitudinally with respect to said driven shaft but only longitudinally with respect to said driving shaft; a collar mounted upon said tubular shaft so as to be rotatably but not longitudinally movable with respect thereto; springs resiliently supporting said collar against movement toward said driving shaft; a friction disk borne by said tubular shaft; other disks adapted to connect said first-named disk with said driven shaft; and means for adjusting the initial position of said collar and thus of the disk borne thereby independently of said resilient means.

Signed by me this 2nd day of December, 1908.

CYRUS B. KURTZ.

Attested by—
MARY GLADWELL,
JNO. F. OBERLIN.

---

Correction in Letters Patent No. 942,266.

It is hereby certified that in Letters Patent No. 942,266, granted December 7, 1909, upon the application of Cyrus B. Kurtz, of Lakewood, Ohio, for an improvement in "Transmission-Gearing," an error appears in the printed specification requiring correction, as follows: Page 3, line 12, after the word "thereto," the semicolon should be stricken out; and that the said Letters Patent should be read with this correction therein, that the same may conform to the record of the case in the Patent Office.

Signed and sealed this 28th day of December, A. D., 1909.

[SEAL.]

E. B. MOORE,
*Commissioner of Patents.*

Correction in Letters Patent No. 942,266.

It is hereby certified that in Letters Patent No. 942,266, granted December 7, 1909, upon the application of Cyrus B. Kurtz, of Lakewood, Ohio, for an improvement in "Transmission-Gearing," an error appears in the printed specification requiring correction, as follows: Page 3, line 12, after the word "thereto," the semicolon should be stricken out; and that the said Letters Patent should be read with this correction therein, that the same may conform to the record of the case in the Patent Office.

Signed and sealed this 28th day of December, A. D., 1909.

[SEAL.]

E. B. MOORE,
*Commissioner of Patents.*